United States Patent
Neary et al.

[19]

[11] Patent Number: 6,009,836
[45] Date of Patent: Jan. 4, 2000

[54] SELF-DRYING PET LITTER BOX

[75] Inventors: John F. Neary, 7540 34th St. South, St. Petersburg, Fla. 33711; John T. Peddy, Clearwater, Fla.

[73] Assignee: John F. Neary, St. Petersburg, Fla.

[21] Appl. No.: 09/314,230

[22] Filed: May 18, 1999

[51] Int. Cl.⁷ .................................................. A01K 29/00
[52] U.S. Cl. .................................................. 119/165
[58] Field of Search .................................. 119/161, 165, 119/166, 167, 168, 452, 455, 459, 463, 462

[56] References Cited

U.S. PATENT DOCUMENTS

| | | | |
|---|---|---|---|
| 4,649,862 | 3/1987 | Neary | 119/1 |
| 4,696,257 | 9/1987 | Neary | 119/1 |
| 5,564,364 | 10/1996 | Kovacs et al. | 119/163 |
| 5,755,181 | 5/1998 | Petkovski | 119/163 |

*Primary Examiner*—Thomas Price
*Attorney, Agent, or Firm*—Carlton Fields

[57] ABSTRACT

A self-drying animal litter box includes a box-like container shell having an upper portion, a lower portion and side walls, with an opening formed through the lower portion and a shelf positioned within the container shell along the side walls, and a flange extending downwardly from the lower portion, and also includes a lower tray having a channel for receiving at least a portion of that flange, with the container shell being removably attached to the lower tray. A panel having a generally planar top surface with a plurality of apertures formed therethrough is supported on the shelf, with the heating element attached to and spaced a predetermined distance below the panel and a heating element control coupled to the heating element and to the panel to maintain the panel at a substantially uniform and predetermined temperature for a preselected time.

13 Claims, 4 Drawing Sheets

SELF-DRYING PET LITTER BOX

BACKGROUND OF THE INVENTION

1. Field of the Invention

This invention relates generally to the field of disposal apparatus for pet body waste. More particularly, it relates to litter boxes used for collecting pet waste. Still more particularly, it relates to apparatus for drying waste and litter contained within such pet litter boxes.

2. General Objects of the Invention

It is an object of the present invention to provide an improved self-drying pet litter box. It is another object of the present invention to provide an apparatus that may reduce the presence of bacteria and moisture in a litter box that has been used by a pet. It is still another object of the present invention to provide an apparatus that may reduce the unpleasant odors associated with the use of a litter box and may allow the same litter to be used for an extended period of time.

BRIEF DESCRIPTION OF THE DRAWINGS

A particularly preferred embodiment of the self-drying pet litter box of this invention will be described in detail below in connection with the drawings in which.

DETAILED DESCRIPTION

Figure 1:
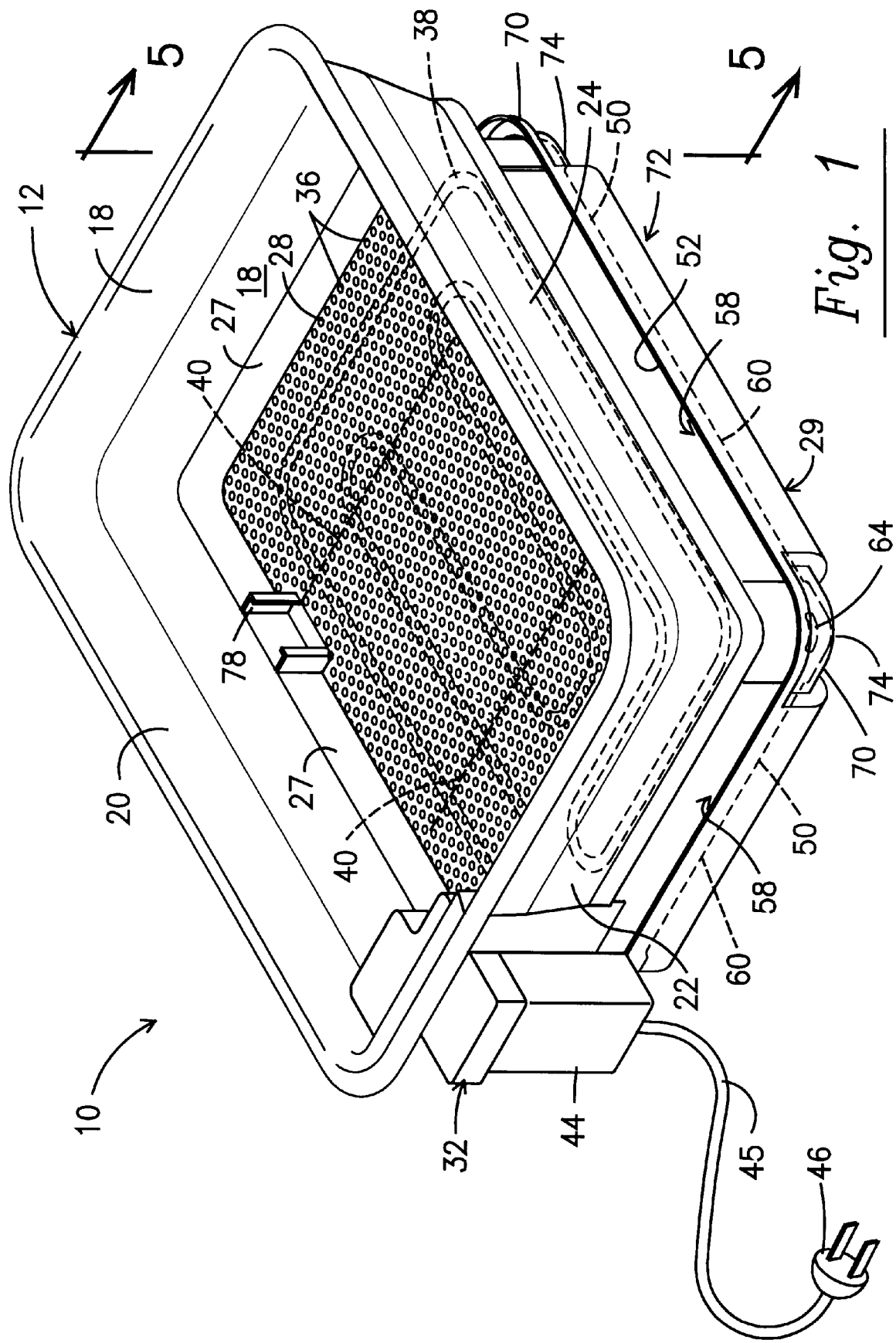
FIG. 1 is a perspective view of the apparatus of the present invention.

A particularly preferred embodiment of the improved self-drying pet litter box of the present invention is illustrated in FIGS. 1–6. Similar reference characters refer to similar parts throughout the several views of the drawings. It comprises an upper, bottomless, box-like shell 12, having an upper portion 14 and a lower portion 16 and four lateral sides 18, 20, 22 and 24, which shell is attachable to a lower tray, generally indicated as 29. While the particular litter box illustrated in the figures is a generally rectangular container, it will be understood and appreciated that round or any other suitable shapes may be used with equal facility. The upper shell 12 may be formed of any suitably rigid material, such as a thermoplastic resin, and may be suitably injection molded. A generally horizontal shelf 26 is preferably formed within the shell intermediate the upper portion 14 and the lower portion 16 along at least a portion, although preferably continuously along the entire portion, of the sidewalls 18, 20, 22 and 24. The shelf 26 is particularly dimensioned and configured as a thin lip for receiving a panel 28, onto which a suitable particulate litter material, such as, dried clay particles well known in the art, may be disposed.

The preferred embodiment of the upper portion 14 of the upper shell 12 has a generally vertical portion 27 that extends upwardly from the shelf 26 in a substantially vertical manner, suitably for about ¾ to 1¼ inches, and preferably for about one inch, and then flairs upwardly and outwardly to its top edge. The substantially vertical portion 27 generally inhibits heat from escaping at the perimeter portions of the panel 28, as described below, thereby promoting a uniform heating of the panel 28 particularly at its perimeter portions. In addition, it also provides a suitable fill line indicating the preferred amount of litter to place upon the panel 28.

Figure 2:
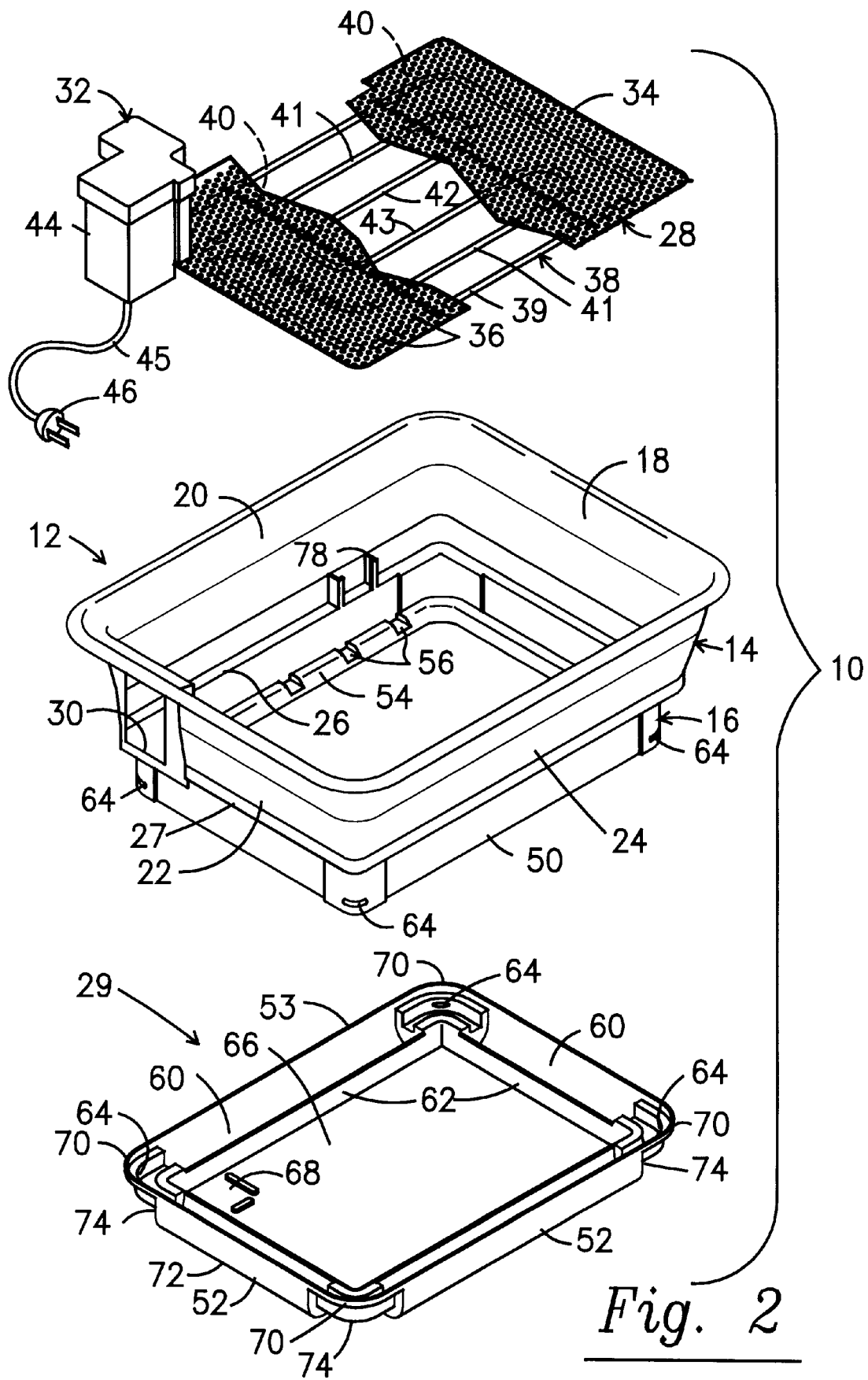
FIG. 2 is an exploded perspective view of the apparatus of the present invention, partially in section.

As can be seen in the combined views of FIGS. 1 and 2, the panel 28 and control box 32 may be inserted within the upper shell 12 as shown in FIG. 1. An aperture 30 is preferably formed through sidewall 22 for positioning at least a portion of the control box 32. The aperture is suitably dimensioned and configured for removably receiving the control box 32.

The panel 28, which may be coated with a non-conducting coating, such as silicone, includes at least one substantially planar surface and is supported within the shell 12 by a suitable support such as lip or shelf 26. The shelf 26 engages at least a portion of the perimeter of the panel 28 to support the panel 28 in a substantially horizontal position, such that the panel 28 may support the particulate litter material that my be placed thereupon. Preferably, the panel 28 is slightly smaller than the horizontal cross section of upper shell 12 at shelf 26 such that the engagement between the shelf 26 and the perimeter of the panel 28 serves to minimize the passage of litter material between the panel perimeter and the side portions 22, 24, 26 and 28 of upper shell 12.

Figure 3:
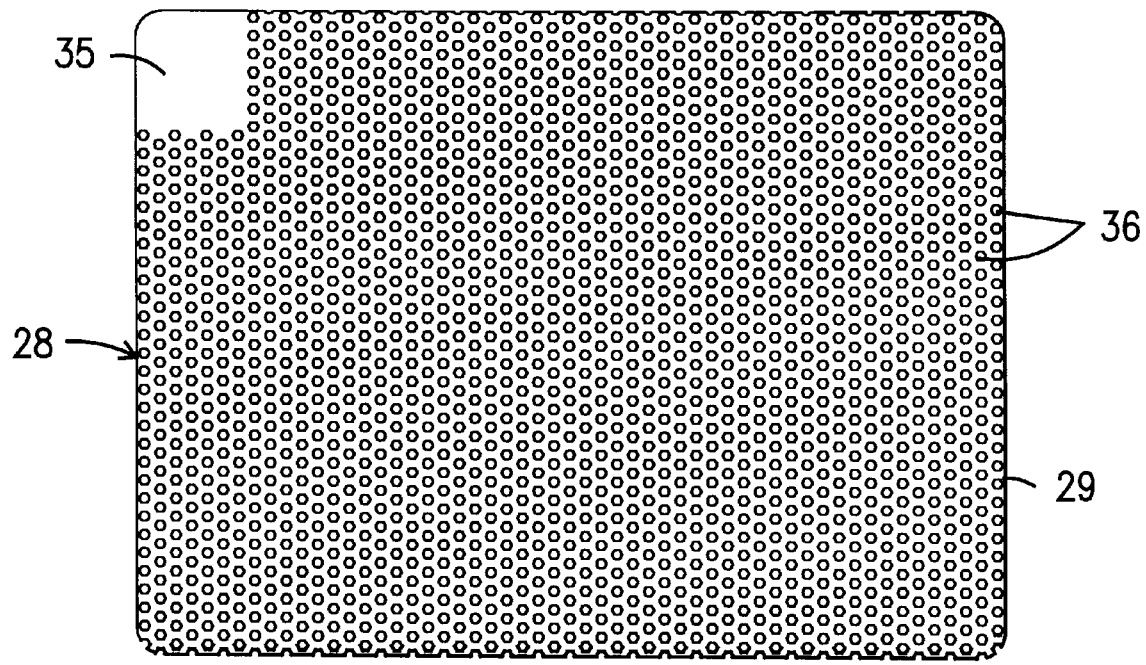
FIG. 3 is a top view of the panel of FIG. 2.
Figure 6:
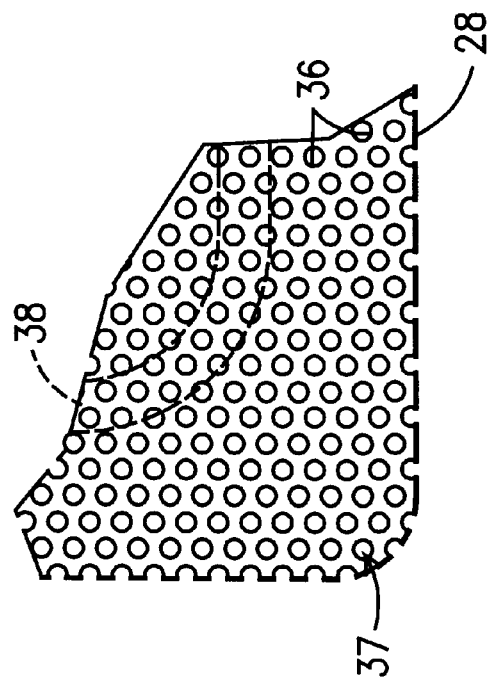
FIG. 6 is an enlarged fragmentary sectional view of the panel of FIG. 3.
Figure 5:
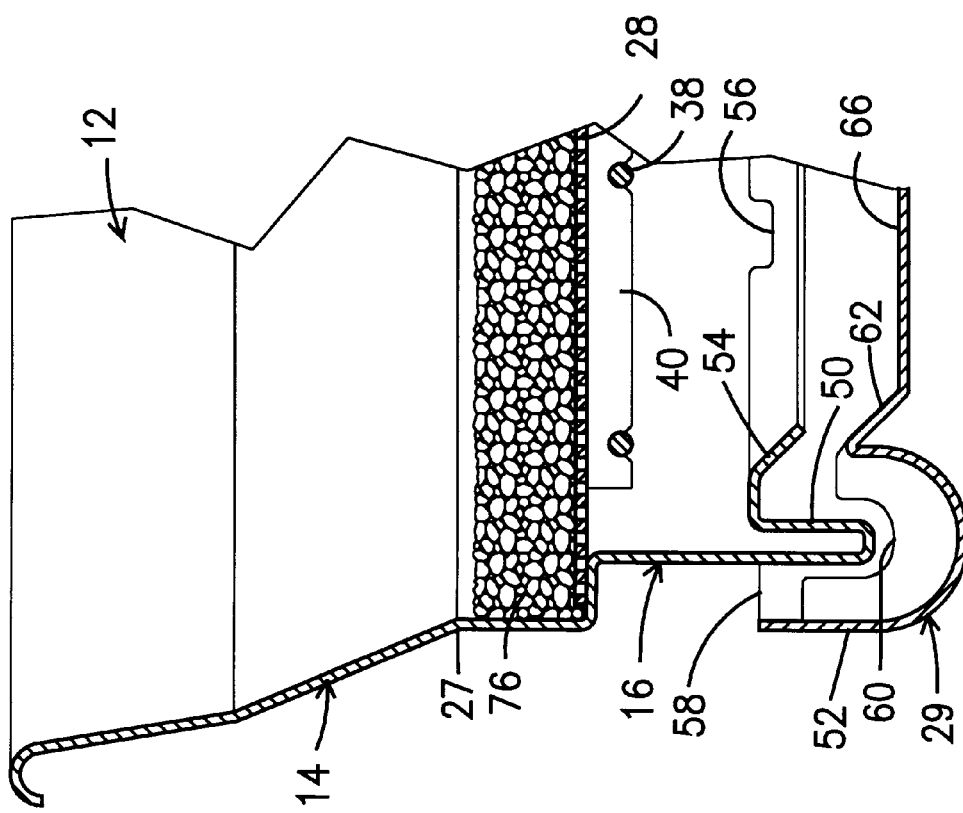
FIG. 5 is a fragmentary sectional view of the apparatus of FIG. 1 taken along lines 5—5.

As is shown in FIGS. 2, 3 and 6, the panel 28 includes a solid corner portion and plurality of apertures 36, suitably perforations, formed substantially uniformly therethrough and distributed across substantially the entire panel. Preferably, the panel 28 also includes a solid corner portion 35 without such apertures. The apertures 36 are formed at a generally uniformly spaced apart distance and define an open surface area ranging generally between 15% to 40% of the total surface area of the panel 28, with a preferred open surface area of about 25% to 30%. In general, each aperture has a cross-sectional area that is generally smaller than the average crosssectional area of an individual particle of litter material. Preferably, as shown in FIG. 6, the diameter 37 of each aperture may range from about 0.06 inches to about 0.09 inches, with an optimal diameter 37 of about 0.065 to 0.075 inches. It has been determined that the panel 28 configured with apertures 36 arranged and dimensioned as just described, facilitates the flow of air therethrough and still resists substantial passage of the litter particles. It is found that even if a substantial portion of the apertures become blocked by litter particles or the like, this panel configuration will still allow an adequate amount of air to flow therethrough in connection with the operation of the heating element, generally indicated as 38, as described below.

Adjacent to the panel 28 in this preferred embodiment is also provided suitable means for heating and drying the panel 28, the particulate litter material that is supported by the panel, the liquid and solid waste material deposited by an animal on the litter material as well as the materials that might sift through the panel onto the lower tray 29. In the preferred embodiment illustrated in the figures, a heating element 38 is preferably affixed to and spaced a predetermined distance, suitably less than 1 inch, below the panel 28. Preferably, the heating element is spaced between ¼ inch to 1 inch, with a preferred distance of about of an inch, below panel 28 by appropriate supports 40. Preferably, the supports 40 are support brackets formed of a substantially rigid, material of relatively low heat conductivity, such as stainless steel, that minimize the undesirable occurrence of hot spots on the panel 28.

Figure 4:
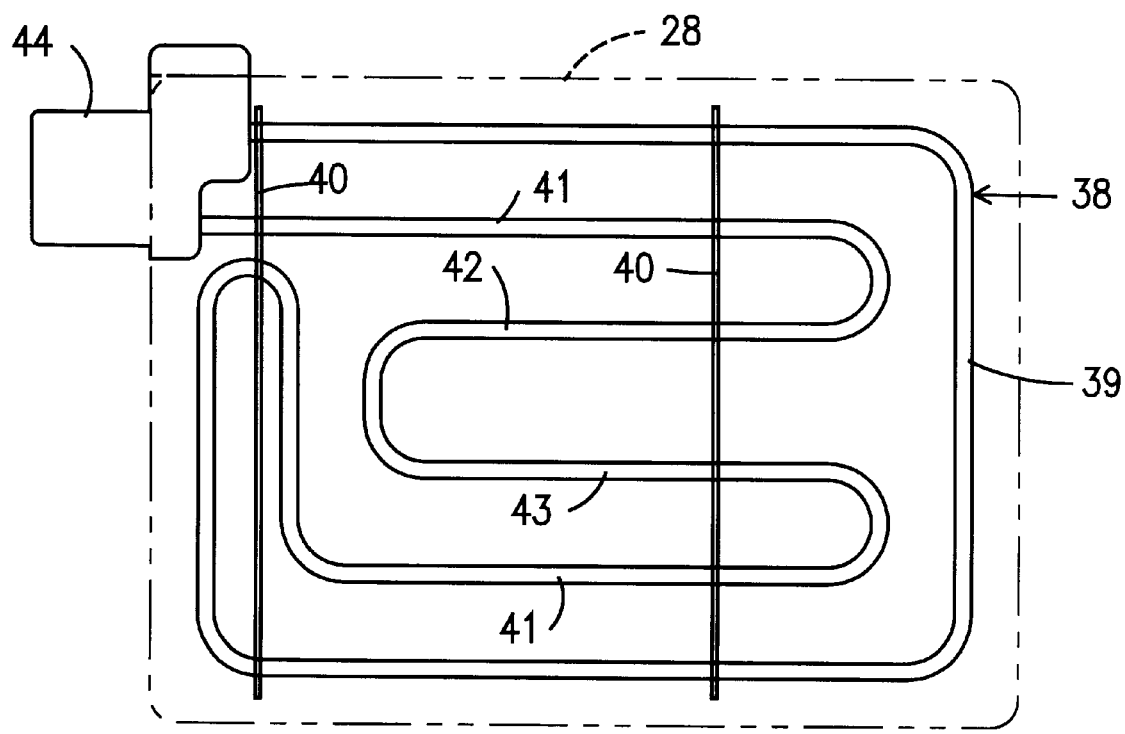
FIG. 4 is a top sectional view of the heating element of FIG. 2.

Although various arrangements of heating elements may suitably be used, in this preferred embodiment, heating element 38 is in the form of a thick conductor, suitably a stainless steel Calrod element applied directly to a metal panel. Heating element 38 is attached below the panel 28 in a suitable arrangement as to heat the top surface of panel 28 to a substantially uniform temperature. As shown in FIG. 4, the heating element is oriented at preferred spacing intervals from the perimeter of the panel 28 to its interior to provide the desired uniform temperature throughout the top surface panel 28. More specifically, the heating element 38 is attached in a spaced apart relation to the panel 28 with a plurality of spaced apart rows that generally increase in distance from the panel perimeter toward the innermost row or rows, shown in FIG. 4. For example, given a box-like litter box 10 with a panel 28 having approximately 25% open surface area and panel dimensions of about 15¼"×11", a continuous length of heating element 38 is positioned preferably about "from the panel 28 in a curved relation, with the outermost segment 39 of heating element 38 spaced about inches from the panel perimeter. The next inner segments 41 of heating element 38 are positioned about 1¼" inwardly from the outermost segment 39, with the final two segments 42 and 43, respectively, each being spaced about 1½" inwardly from their respective adjacent outer heating element segment 41 and spaced about 1¾" from each other.

Each end of the heating element 38 preferably includes suitable connector means, such as a plug, that are coupled to a control means 44 within control box 32. An appropriate cord 45 is coupled to control means 44 and preferably includes a conventional plug 46 that may be connected to an appropriate outlet from which electrical current may flow through the cord 42 to the heating element 38 under the control of control means 44. The control means 44 includes an appropriate thermostat positioned adjacent, and preferably engaging, the panel 28 at solid portion 35 (shown in FIG. 3), as well as appropriate circuitry well known in the art to control the application of heat to the panel 28. Preferably, the solid corner portion 35 of the panel 28 is dimensioned and configured to provide to the control means 44 a temperature that approximates the temperature of any exposed portions of the panel for safety reasons, as well as to provide a protective surface above a scented cartridge holder positioned therebelow. The temperature of the panel 28 and the litter material that may be supported thereupon are raised to predetermined temperatures and maintained at such temperatures for a time sufficient to destroy bacteria residing upon the panel and upon the particular litter material, as well as the bacteria carried by the liquid and solid waste deposited thereupon. This control means 44 preferably also provides for or is connected to suitable timing apparatus for subsequent discontinuing of the application of heat after the heat has been so applied for a predetermined period of time at the predetermined temperature. In addition, the control box 32 is dimensioned and configured for insertion into and withdrawal from the aperture 30 formed through the side 22 of the upper shell 12 to facilitate cleaning the apparatus.

In order to destroy the bacteria associated with the fecal material and urea, it has been determined that the particulate litter material should be dried and heated. Preferably, a temperature of about 145 for a period of at least about 30 minutes, suitably between about 30 and 120 minutes. In general, the amount of time and heat necessary to operate heating element 38 is determined by considering a variety of factors, including the surrounding environmental conditions, the characteristics of the panel 28, the amount of particulate litter material placed on the panel, the size and shape of the litter box 10 and the amount of moisture that may accumulate within the box 10. For example, with one inch of particulate litter material positioned upon panel 28 that has a 25% open surface area that is positioned about "away from heating element 38, with from 3 to 6 ounces of moisture, it generally requires heating the panel to about 155–190 F. for about 1½ to 2 hours to safely and effectively achieve the desired temperature and air flow to substantially reduce moisture and minimize the microbial contamination of the bacteria present in the urea and fecal matter that may be disposed thereupon. In addition, heating element 38 also heats and dries the litter and waste materials that may sift through the panel apertures 36 onto lower tray 29 to substantially prevent urine-derived moisture from further accumulating, which is a primary factor in reducing the amount of bacterial proliferation within the litter box 10. Both the temperature and the time of heating may be controlled by the control means 44, which may include both thermostatic and timer apparatus, whereby the application of heat will be discontinued after the predetermined period. Also, soiled areas not completely dried or sterilized after one heating cycle will be so with the following days' heating cycles.

Lower portion 16 of the upper shell 12 is suitably dimensioned and configured for a releasable attachment to the lower tray 29. The lower edge of the lower portion 16 preferably extends a predetermined length downwardly and folds inwardly and upwardly from the lower edge 16 to define the shoulder 50 along at least a substantial portion of and preferably the entire, perimeter of the lower portion 16. A flange 54 extends inwardly and downwardly from the lower portion 16, preferably in a generally arcuate manner, a predetermined distance above the lower edge of shoulder 50. The flange 54 is suitably dimensioned and configured for maintaining a spaced apart relationship with the inner wall 60 of the lower tray 29 when attached thereto, generally providing ventilation to facilitate the passage of air through the space between the lower tray inner wall 60 and the flange 50. This may be accomplished, for example, by forming a plurality of solid notches 56 along the top portion of the flange 50 that prevent the lower tray inner wall 62 from engaging the upper portion of the flange 54. Alternatively, or in addition to the notches 56, a locking mechanism, suitably friction connectors 64 positioned at the respective lower corners of the upper shell 12, may be employed both to prevent the engagement between the upper portion of flange 54 and the inner wall 62 of the lower tray and to provide a substantially sturdy attachment between the upper shell 12 to the lower tray 29. Of course, other locking mechanisms well known to those skilled in the art may be used with equal facility.

The lower tray 29 includes an outer wall 52 having a predetermined height that defines the outer wall of a perimeter channel 60 positioned adjacent thereto. The channel 60 also includes an inner wall 62 and is dimensioned and configured for receiving at least a portion of the shoulder 50 generally within, but preferably not engaging, the channel 60. As is shown in FIG. 2, the inner wall 62 of the channels 60 defines the enclosing walls of the inner tray portion 66. The inner portion 66 is dimensioned and configured to cover substantially the entire projected area of the panel 28 and includes a substantially planar surface that extends below and adjacent the walls 62, such that it may operate as a receptacle for liquid and fines of particulate material that may sift through panel 28. In addition, the surface 66 is spaced a predetermined distance below the heating element 38 such that, as the heating element is energized, it dries the urine and other materials that may fall through the apertures 36. In the preferred embodiment illustrated in FIG. 2, the corner portion of the inner tray portion 66 that is to be positioned beneath the control means 44 includes a holder 68 suitably dimensioned and configured for receiving a commercially available scented cartridge, which may effect a pleasant fragrance when heated by heating element 38. By positioning the cartridge holder 68 below the solid portion 35 of the panel 28, fines of litter material, urine and fecal matter will generally not fall onto or contaminate the scented cartridge positioned therein.

The space between the lower tray outer wall 52 and the shoulder 50 defines at least one air vent 58, preferably extending along each respective side of the litter box 10, such that when the upper shell 12 is attached to the lower tray 29, air may flow uniformly into the air vents 58. This air then may flow around the shoulder 50 and between the flange 54 and the inner wall 60 into the interstitial space between the lower tray inner portion 66 and the panel 28. This air flow may further be enhanced when the heating element 38 is energized, as the heated air will generally rise by convection through the panel 28 and conveniently be replaced by air entering through the vents 58. The air flow into vents 58 is preferably substantially balanced to maintain the preferred uniform heating of the panel 28.

The lower tray 29 is preferably configured such that the inner tray portion 66 is elevated with respect to lower tray base portion that engages the surface on which the litter box 10 may be placed. In the preferred embodiment illustrated in the figures, the lower portions 72 of the channels 60 extending between the respective comers 70 of the lower tray 29 define the lower tray base portion. The inner tray portion 66 and the respective comers 70 are suitably spaced above the surface, with the comers providing an outlet 74 through which heated air may escape as the heating element 38 is energized and the lower tray is heated. Preferably, the lower channel base portions 72 have a suitable surface area sufficient to resist compressing downwardly a substantially soft surface, such as carpet, on which the tray 29 may be positioned. In addition, as discussed with respect to the upper shell 12, the lower tray also preferably includes a corresponding locking mechanism, such as the resistive connectors 64 positioned in receiving relation with respect to the upper container components at each respective comer 70 the lower tray 29.

With the preferred embodiment of the structure of the present invention described above, the manner of operation of such apparatus may be as follows. With the perimeter of the panel 28 engaging the shelf 26 and the heating element spaced, suitably about", below the panel 28, conventional particulate cat litter material 76, such as Fuller's Earth Clay, is placed over the top panel 28, preferably up to where the sides 18, 20, 22 and 24 flair out from the vertical portion 27 of the upper shell 12.

After an animal has used the litter box, discharging its urine and feces upon the litter material 76, the heating element may be activated by control means 44. Activation of the apparatus by control means 44 provides the application of electrical current to the heating element 24 to heat the panel 16 and the inner portion of the lower tray 66. Thus, the heat from the heating element 38 supplies heat substantially to the entire litter material uniformly as well as to the lower tray inner portion 66. Because during heating, some portion of the panel 28 may become exposed directly to the air, the heating temperature preferably is controlled by control means 44 such that the surface temperature of any exposed portions of the panel do not exceed about 200 F. Due to the particular attachment between the shoulder 50 of the upper shell 12 and the channels 60 of the lower tray together with activating the heating element 38, the heat is passed both by conduction and convection through the particulate litter material 76. With the apertures 36 providing about a 25% open surface on the panel 28, the heated air will tend to pass through the apertures 36 and suitably heat and/or dry the litter material to about 145 F. Cool air enters the air vents 58 and passes between the arcuate portion 56 of the flange 54 and the channels 60 to replace at least some of the heated air that passes through the forminous panel 28, thereby creating a pressure differential of as much as 1 pound per square inch between the cool air outside the litter box 10 and the heated air positioned in the interstitial space between the lower tray 29 and the panel 28. Preferably, the shoulder 50 extends into the channel about ½ inches to inhibit the heated air within the interstitial space from exiting through the air vents 58. This effect may be enhanced by increasing both the depth of the channel 60, suitably the height of the inner wall 62, and the length of the shoulder 50.

The heating element 38 remains energized under the control means 44, suitably including a thermostat control and, if desired, a timer, such that the average temperature of the litter material 76 supported on the panel 28 should be raised daily to a predetermined level, suitably at least about 145 F., for a predetermined period, suitably about 1½ hours. Of course, the length of time necessary to destroy bacteria residing within the litter material depends largely in part upon the amount of moisture and depth of litter material 76 that is supported on the panel 28. The activation of the heating element 38 also heats and promotes the drying of the excess urine and particulate litter that may sift through the apertures 36 of the panel 28, thereby reducing the amount of bacteria thereupon. The heat from heating element 38 also activates the scented cartridges that may appropriately be positioned in holder 68 positioned on the lower tray and holder 78 positioned along a side of the upper shell 12 adjacent the panel 28. While only two such cartridge holders are illustrated in the figures, it will be understood and appreciated that a larger number of cartridge holders of any desired type in alternative positions, suitably upon the side of control means 44, may improve the odor reducing effect of the litter box 10. Preferably, the sanitizing procedure described above is carried out on at least a daily basis to control and reduce the prevalence of bacteria and viruses deposited thereupon. At the end of the sanitizing cycle, the heating element 28 is de-energized under the control of control means 44, suitably when the litter material 76 and the lower tray inner portion 66 has been substantially dried with most of the bacteria being killed by the heating process. Once de-energized, the sanitizing effect may continue for some duration depending largely upon the amount of residual energy stored in the particulate litter material 76 and the heating element 38. An additional drying period may occur after use of litter box 10 by a pet, with the heat from both urine and fecal matter effecting an increase in air flow through the air vents 58 due to the preferred configuration of the attachment between the lower tray 29 and the upper shell 12.

While the foregoing describes a particularly preferred embodiment of the pet litter box of the present invention, it is to be understood that this is merely illustrative only of the principals and is not to be considered limitative thereof. It will be further understood that numerous variations and modifications of this apparatus, all within the scope of this invention, will readily occur to those skilled in the art.

What is claimed is:

1. An improved self-drying animal litter box for controlling odors by destroying bacteria comprising:

a box-like container shell having an upper portion, a lower portion and side walls extending between said upper portion and said lower portion, an opening formed through said lower portion of said container shell, a shelf positioned within said container shell along said side walls intermediate said upper portion and said lower portion, and a flange extending generally downwardly from at least a portion of said lower portion proximal its perimeter;

a lower tray having a channel positioned generally along its perimeter, said channel dimensioned and configured for receiving at least a portion of said flange therein, said container shell removably attached to said lower tray such that the attachment between the container shell and the lower tray form a plurality of air passages between said channel and said flange;

a panel having a generally planar top surface with a plurality of apertures formed therethrough, said panel removably mounted within said container shell generally horizontally is upon said shelf in generally overlying relation to said opening of said lower portion of said upper container, said plurality of apertures formed at a generally uniformly spaced apart distance and defining an open surface area comprising part of the total surface area of said top surface of said panel, each said aperture having a cross sectional area generally smaller than the average cross sectional area of an individual particle of said litter;

a heating element attached to and spaced a predetermined distance below said panel; and a heating element control coupled to said heating element and to said panel to maintain said panel at a substantially uniform and predetermined temperature for a preselected time period.

2. The litter box of claim 1 wherein said panel includes edge portions engaging said shelf to substantially exclude particulate litter material placed into said box and on said panel from passage between said panel edge portions and said shelf into the area beneath said panel.

3. The litter box of claim 1 wherein said predetermined temperature is such as to maintain said particulate material at a temperature of not less than about 145 degrees F.

4. The litter box of claim 3 wherein said predetermined temperature is less than about 200 degrees F.

5. The litter box of claim 1 wherein said preselected time is not less than about 30 minutes.

6. The litter box of claim 1 wherein said panel open surface area comprises between about 15% and about 40% of said panel top surface total surface area.

7. The litter box of claim 1 wherein said panel open surface area is in the range of 25% to 30% of said panel top surface total surface area.

8. The litter box of claim 1 wherein said panel apertures comprises holes having diameters in the range of about 0.06 to about 0.09 inches.

9. The litter box of claim 1 wherein said panel is of generally rectangular configuration having a portion adjacent at least one corner thereof free of said apertures to define a solid corner portion.

10. The litter box of claim 9 wherein said heating element control is mounted to said panel on said solid corner portion.

11. The litter box of claim 9 further comprising a holder for a scented fragrance cartridge positioned on said lower tray beneath said panel solid corner portion.

12. The litter box of claim 1 further comprising a locking mechanism to provide attachment between said container shell and said lower tray.

13. The litter box of claim 1 wherein said air passages between said container shell and said lower tray are of sinuous configuration.

* * * * *